(12) United States Patent
Craven-Bartle et al.

(10) Patent No.: US 9,552,103 B2
(45) Date of Patent: Jan. 24, 2017

(54) OPTICAL INCOUPLING FOR TOUCH-SENSITIVE SYSTEMS

(75) Inventors: Thomas Craven-Bartle, Södra Sandby (SE); Håkan Bergström, Torna Hällestad (SE)

(73) Assignee: Flatfrog Laboratories AB, Lund (SE)

( * ) Notice: Subject to any disclaimer, the term of this patent is extended or adjusted under 35 U.S.C. 154(b) by 667 days.

(21) Appl. No.: 13/980,702

(22) PCT Filed: Jan. 30, 2012

(86) PCT No.: PCT/SE2012/050086
§ 371 (c)(1),
(2), (4) Date: Jul. 19, 2013

(87) PCT Pub. No.: WO2012/105893
PCT Pub. Date: Aug. 9, 2012

(65) Prior Publication Data
US 2013/0300716 A1    Nov. 14, 2013

Related U.S. Application Data

(60) Provisional application No. 61/438,675, filed on Feb. 2, 2011.

(30) Foreign Application Priority Data

Feb. 2, 2011    (SE) ...................................... 1150071

(51) Int. Cl.
*G06F 3/042*    (2006.01)
(52) U.S. Cl.
CPC ... *G06F 3/0421* (2013.01); *G06F 2203/04103* (2013.01); *G06F 2203/04109* (2013.01)

(58) Field of Classification Search
CPC .................. G06F 3/0421; G06F 2203/04103; G06F 2203/04109
See application file for complete search history.

(56) References Cited

U.S. PATENT DOCUMENTS 4,484,179 A * 11/1984 Kasday ................... G01L 1/247
178/18.01
4,593,191 A * 6/1986 Alles ....................... G01L 1/247
250/227.14
(Continued)

FOREIGN PATENT DOCUMENTS

WO   WO-96/10148 A1   4/1996
WO   WO-96/23649 A1   8/1996
(Continued)

*Primary Examiner* — Tom Sheng
(74) *Attorney, Agent, or Firm* — Harness, Dickey & Pierce

(57) ABSTRACT

A touch-sensitive apparatus comprises a light transmissive panel, an illumination arrangement and a detection arrangement. The illumination arrangement is configured to couple light into the panel via an incoupling site such that the light propagates by total internal reflection in opposite top and bottom surfaces of the panel and such that an object touching the top or bottom surface causes a change in the propagating light. The detection arrangement comprises a light detector arranged to detect the change in the propagating light. A compact and robust incoupling site is defined by a sheet-like micro-structured surface portion which is fixedly arranged on one of the top and bottom surfaces and configured to transmit light having an angle of incidence that enables light propagation by TIR inside the panel.

22 Claims, 4 Drawing Sheets

(56) References Cited

U.S. PATENT DOCUMENTS

| | | | |
|---|---|---|---|
| 4,673,918 A * | 6/1987 | Adler | G06F 3/0421 |
| | | | 250/227.31 |
| 5,175,030 A | 12/1992 | Lu et al. | |
| 6,803,900 B1 | 10/2004 | Berkoff et al. | |
| 6,972,753 B1 | 12/2005 | Kimura et al. | |
| 7,432,893 B2 | 10/2008 | Ma et al. | |
| 7,435,940 B2 | 10/2008 | Eliasson et al. | |
| 8,441,467 B2 * | 5/2013 | Han | G06F 3/04883 |
| | | | 178/18.09 |
| 2003/0137494 A1 * | 7/2003 | Tulbert | G06F 3/0423 |
| | | | 345/173 |
| 2004/0252091 A1 | 12/2004 | Ma et al. | |
| 2005/0248848 A1 | 11/2005 | Whitehead et al. | |
| 2006/0114237 A1 | 6/2006 | Crockett et al. | |
| 2007/0075648 A1 | 4/2007 | Blythe et al. | |
| 2008/0007541 A1 | 1/2008 | Eliasson et al. | |
| 2008/0291668 A1 * | 11/2008 | Aylward | G02B 6/0068 |
| | | | 362/225 |
| 2009/0067178 A1 * | 3/2009 | Huang | G02B 5/0242 |
| | | | 362/326 |
| 2009/0267919 A1 | 10/2009 | Chao et al. | |
| 2010/0259939 A1 | 10/2010 | Chen et al. | |
| 2010/0302196 A1 * | 12/2010 | Han | G06F 3/0425 |
| | | | 345/173 |
| 2011/0074735 A1 * | 3/2011 | Wassvik | G06F 3/0421 |
| | | | 345/175 |
| 2011/0163998 A1 * | 7/2011 | Goertz | G06F 3/0416 |
| | | | 345/175 |
| 2012/0068973 A1 | 3/2012 | Christiansson et al. | |
| 2012/0181419 A1 * | 7/2012 | Momtahan | G06F 3/0421 |
| | | | 250/221 |

FOREIGN PATENT DOCUMENTS

| | | |
|---|---|---|
| WO | WO-2007/058924 A2 | 5/2007 |
| WO | WO-2007/112742 A1 | 10/2007 |
| WO | WO-2008/017077 A2 | 2/2008 |
| WO | WO-2008/038066 A2 | 4/2008 |
| WO | WO-2009/048365 A1 | 4/2009 |
| WO | WO-2009/077962 A2 | 6/2009 |
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/056177 A1 | 5/2010 |
| WO | WO-2010/064983 A2 | 6/2010 |
| WO | WO-2010/134865 A1 | 11/2010 |
| WO | WO-2011/049511 A1 | 4/2011 |
| WO | WO-2011/139213 A1 | 11/2011 |

* cited by examiner

OPTICAL INCOUPLING FOR TOUCH-SENSITIVE SYSTEMS

CROSS-REFERENCE TO RELATED APPLICATIONS

This application is the national phase under 35 U.S.C. §371 of PCT International Application No. PCT/SE2012/050086 which has an International filing date of Jan. 30, 2012, which claims priority to Swedish patent application number 1150071-7 filed Feb. 2, 2011 and to U.S. provisional patent application No. 61/438,675 filed Feb. 2, 2011.

TECHNICAL FIELD

The present invention relates to touch-sensitive systems that operate by light transmission through light transmissive panels, and in particular to optical solutions for coupling light into such panels.

BACKGROUND ART

The prior art comprises different types of touch-sensitive systems that operate by transmitting light inside a solid light transmissive panel, which is defined by two parallel boundary surfaces connected by a peripheral edge surface. Specifically, light is injected into the panel so as to propagate by total internal reflection (TIR) between the boundary surfaces. An object that touches one of the boundary surfaces ("the touch surface") causes a change in the propagating light that is detected by one or more light sensors. In one implementation, e.g. as disclosed in WO2008/017077, US2009/267919 and WO2010/056177, light sensors are arranged behind the panel to detect light which scatters off the touching object and escapes the panel via the boundary surface opposite to the touch surface. In another implementation, e.g. as disclosed in U.S. Pat. No. 7,435,940, light sensors are arranged at the periphery of the panel to detect light which scatters off the touching object and is confined within the panel by total internal reflection. In yet another implementation, e.g. as disclosed in WO2010/006882 and WO2010/134865, light sensors are arranged at the periphery of the panel to sense the attenuation of the light transmitted through the panel.

In order to achieve a uniform illumination of the touch surface from within the panel, the incoupling site is often elongate and extends along a significant portion of the panel. Most prior art documents propose injecting the light through an elongate portion of the peripheral edge surface, without any dedicated coupling elements. Such an approach is possible since the light can be injected at a relatively steep angle to the edge surface, resulting in comparatively small reflection losses at the edge surface. Also, such an incoupling site does not add significantly to the thickness of the touch system. However, incoupling via the edge surface requires the edge surface to be highly planar and free of defects. This may be difficult and/or costly to achieve, especially if the panel is thin and/or manufactured of a comparatively brittle material such as glass. Incoupling via the edge surface may also add to the footprint of the touch system. Furthermore, it may be difficult to optically access the edge surface if the panel is attached to a mounting structure, such as a frame or bracket, and it is also likely that the mounting structure causes strain in the edge surface. Such strain may affect the optical quality of the edge surface and result in reduced incoupling performance.

Above-mentioned WO2010/006882 and WO2010/134865 propose incoupling of light via elongate wedges that are attached and optically coupled (glued) to the top or bottom surfaces. Such an approach may mitigate any strict requirements for the surface properties of the edge surface and/or facilitate mounting of the panel. However, in order to achieve a uniform illumination of the touch surface by propagating light that is collimated in the depth direction of the panel, the incoupling site needs to admit a beam of light with such an extent in the depth direction of the panel that the footprint of the beam on the touch surface essentially overlaps between successive reflections in the touch surface. This, in turn, means that the wedge needs to have a light-receiving surface of corresponding dimensions, resulting in a wedge that may need to project at least 15-20 mm from the top or bottom surface. Such a wedge may add significant thickness and weight of the system. To reduce weight and cost, the wedge may be made of plastic material. On the other hand, the panel is often made of glass, e.g. to attain required bulk material properties (e.g. index of refraction, transmission, homogeneity, isotropy, durability, stability, etc) and surface evenness of the top and bottom surfaces. The present applicant has found that the difference in thermal expansion between the plastic material and the glass may cause the wedge to come loose from the panel as a result of temperature variations during operation of the touch system. Even a small or local detachment of the wedge may cause a significant decrease in the performance of the system.

The present applicant has tried to overcome this problem by attaching several shorter wedges side-by-side so as to form the elongate incoupling site. However, if the touch system requires more than one sheet of light to be injected via the incoupling site, such that the light transmitted via the incoupling site has more than one main direction in the plane of the panel (i.e. as seen in a plan view of the touch surface), the joints between the wedges may interfere with (e.g. reflect) the incoming light and cause a significantly reduced performance of the system. For example, WO2010/006882 and WO2010/134865 disclose techniques for enabling multi-touch sensitivity by injecting plural sheets with different main directions via the incoupling site.

The prior art also comprises US2004/0252091, which discloses an optical touch system in which diverging light beams are coupled into a light transmissive panel for propagation by TIR via large wedges in the form of revolved prisms that are arranged on the top or bottom surface of the panel.

Outside the field of optical coupling elements for touch systems, it is known to provide flat panel displays with a so-called brightness enhancement film (BEF), which is a transparent optical film designed to increase the display brightness through improved light management, see e.g. US2005/248848 and US2010/259939. Specifically, the BEF is a micro-structured sheet with a plurality of prismatic and/or lenticular elements and may be adhered to a light-transmissive substrate in the display. The micro-structures are designed to increase the spatially averaged luminance of the display in a certain range of angles around a normal (perpendicular) viewing direction.

U.S. Pat. No. 6,972,753 discloses an optical touch panel in which a BEF-type element ("a prism lens sheet") is attached to a light source arranged alongside a light guide panel, so as to enhance the directivity of the emitted light before the light is directed onto the edge surface of the light guide panel. The prism lens sheet is not a coupling element, but rather an upstream collimator that ensures that all light is injected in a single, well-defined main direction in the plane of the panel.

U.S. Pat. No. 6,803,900 discloses a lighting system for an LCD display. The lighting system comprises a side-illuminated flat light guide with micro-optical structures on its top surface that give a preferential outcoupling of light. A light pipe is disposed parallel to the light guide to couple light into the light guide through its peripheral edge surface. The light pipe is provided with micro-optical surface structures which cause light, which is guided inside the light pipe from one end towards the other end, to be re-directed towards the peripheral edge surface of the light guide.

WO2007/112742 discloses an optical touch pad in which a beam expander is arranged intermediate an emitter of collimated light and the edge surface of a light transmissive panel. A beam splitter in the form of a plurality of prisms is formed on the edge surface to receive the expanded beam and divide it into two expanded collimated beams with controlled angles of incidence inside the panel. The beam splitter is only useful on the edge surface since it is designed to produce two beams with different directions in the depth direction of the panel.

SUMMARY

It is an object of the invention to at least partly overcome one or more of the above-identified limitations of the prior art. One objective is thus to provide an efficient and robust coupling of light into a light transmissive panel of an optical touch system, which is less dependent on the quality of the edge surface and which allows the light to propagate by total internal reflection inside the panel.

Yet another objective is to provide an incoupling site that adds little weight and size to the touch system.

A further objective is to allow the light transmitted via the incoupling site to have more than one main direction in the plane of the panel.

These and other objects, which may appear from the description below, are at least partly achieved by means of a touch-sensitive apparatus, an optical coupling element and an optical touch panel according to the independent claims, embodiments thereof being defined by the dependent claims.

A first aspect of the invention is a touch-sensitive apparatus which comprises: a light transmissive panel that defines top and bottom surfaces; an illumination arrangement configured to couple light into the panel via an incoupling site such that the light propagates by total internal reflection in at least one of the top and bottom surfaces and such that an object touching said at least one of the top and bottom surfaces causes a change in the propagating light; and a detection arrangement comprising a light detector arranged to detect said change in the propagating light; wherein the incoupling site is defined by a sheet-like microstructured surface portion which is fixedly arranged on one of the top and bottom surfaces and configured to transmit light having an angle of incidence that enables light propagation by total internal reflection inside the panel.

By implementing the incoupling site as a sheet-like microstructured surface portion arranged on the top or bottom surface of the light transmissive panel, light can be coupled into the panel irrespective of the quality of the edge surface of the panel and without the need for a coupling element that adds significant weight and/or size to the touch-sensitive apparatus. As used herein, a "microstructured surface" contains surface structures having at least one dimension in the range of 0.1-1000 μm. Microstructures and microstructured surfaces are well-known per se in the field of optical technology. In one example, the microstructured surface portion comprises a plurality of microreplicated prismatic elements that collectively define a light-receiving surface with a suitable inclination to the light that is to be transmitted by the surface portion (and thereby coupled into the panel). Specifically, the light is transmitted with an angle of incidence, given with respect to the normal of the top and bottom surfaces, that exceeds the critical angle for total reflection in the panel. Each prismatic element may include a light-receiving facet which is designed such that the facets of the surface portion collectively define a coherent or continuous light receiving surface to the light that is to be coupled into the panel. A "facet" is a continuous surface unit of a prismatic element, as is well-known to the person skilled in the art. Each facet may extend in a longitudinal direction of the microstructured surface portion, and the facets may be formed side by side in a transverse direction of the microstructured surface portion. Thereby, the microstructured surface portion may be designed to mimic a light-receiving front surface similar to the planar light-receiving surface of a conventional wedge, but without the need for the microstructured surface portion to project significantly from the top or bottom surface. In fact, the microstructured surface portion may have an essentially flat configuration on the top or bottom surface, and may be designed to project 1 mm or less from the top or bottom surface.

The use of a sheet-like surface portion enables simple integration of the surface portion into the top or bottom surface of the panel, by the microstructure being directly formed in the top or bottom surface, so as to define a robust and durable incoupling site.

Another simple way of defining a compact and robust incoupling site is to manufacture and attach a dedicated sheet-like incoupling element, which defines the microstructured surface portion, to the top or bottom surface of the light transmissive panel. Such a sheet-like incoupling element may be so thin and flexible that it is able to absorb any shear forces that occur in the interface between the incoupling element and the light transmissive panel, e.g. caused by the above-mentioned difference in thermal expansion. Thereby, the sheet-like incoupling element may be firmly and robustly attached to the panel.

In one embodiment, the thickness of the sheet-like incoupling element is less than about 1/10 of the thickness of the light transmissive panel, and more preferably less than about 1/20, 1/30, 1/40 or 1/50 of the thickness of the light transmissive panel. However, the skilled person realizes that the thickness of the sheet-like incoupling element may be optimized in view of the material and structure of the sheet-like element, the expected amount of shear forces, the required durability of the incoupling site, manufacturability issues, etc.

As a further advantage over a conventional wedge, the inventive implementation of the incoupling site enables additional optical functionality to be embedded in the microstructured surface portion, at low cost and little added complexity. For example, the microstructured surface portion may embed at least one of a refractive function, a diffractive function and a diffusive function into its light receiving surface, e.g. by proper design of the above-mentioned facets, and it may even be possible to tailor this additional optical functionality in different parts of the light receiving surface. The provision of such additional optical functionality may further improve the performance of the touch-sensitive apparatus, at the cost of minimal structural changes.

It should be understood that the touch-sensitive apparatus may employ any detection strategy for determining touch data for touching objects. Such detection strategies include, as discussed in the Background section, detecting the energy (or equivalently, power or intensity) of light scattered by the touching objects or detecting the remaining energy (or equivalently, power or intensity) of the propagating light downstream of the touching object.

A second aspect of the invention is an optical coupling element for coupling light into a light transmissive panel in a touch-sensitive apparatus, wherein the light transmissive panel comprises top and bottom surfaces and is arranged to propagate light by total internal reflection from an incoupling site to an outcoupling site, wherein the optical coupling element is formed as a film of light transmissive plastic material, which film comprises a micro-structured surface portion and an attachment surface opposite to the micro-structured surface, the film being adapted for attachment to one of the top and bottom surfaces so as to form at least part of the incoupling site, by the micro-structured surface portion being arranged to transmit light that has an angle of incidence enabling light propagation by total internal reflection inside the panel. Such an optical coupling element is a light-weight component that may be conveniently attached to the top and/or bottom surface of a light transmissive panel so as to define a space-efficient and robust incoupling site that is able to efficiently couple light into the panel for propagation by TIR.

A third aspect of the invention is an optical touch panel for a touch-sensitive apparatus, wherein the optical touch panel comprises top and bottom surfaces and is arranged to propagate light by total internal reflection from an incoupling site to an outcoupling site, wherein the optical touch panel further comprises a micro-structured surface portion which is formed on one of the top and bottom surfaces to define the incoupling site and which is configured to transmit light having an angle of incidence that enables light propagation by total internal reflection inside the panel. Such an optical touch panel may be provided as a unitary component for installation in the touch-sensitive apparatus. The incoupling site may be defined to efficiently couple light into the panel for propagation by TIR by means of the microstructured surface portion which may be implemented as a space-efficient and robust feature on the top and/or bottom surface.

The second and third aspect share the advantages and technical effects of the first aspect. Any one of the embodiments of the first aspect, as outlined above and as further exemplified in the following detailed description, as defined in the dependent claims and as illustrated on the drawings, may be combined with the second and third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
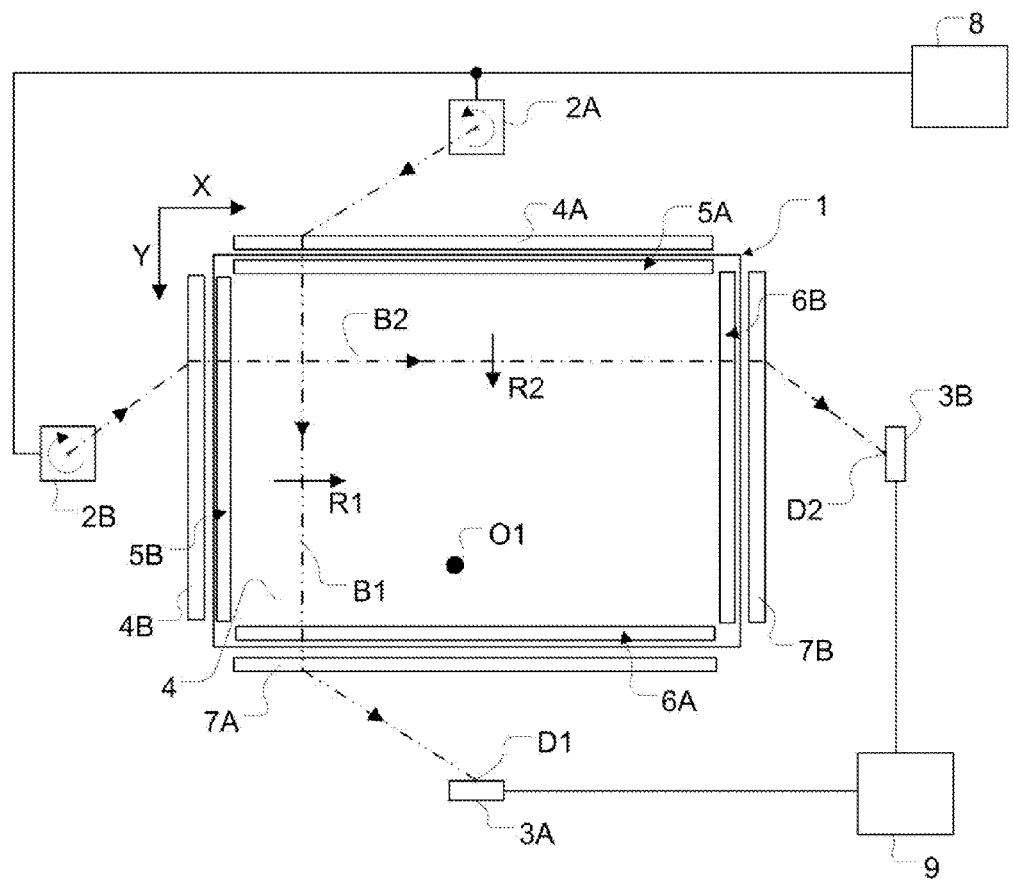
FIG. 1 is a top plan view of a touch-sensitive apparatus according to an embodiment of the invention.

For the sole purpose of explaining principles of the present invention, the following disclosure will be given with respect to a specific type of touch-sensitive apparatus or touch system in which beams are injected into and swept across a light transmissive panel, and touching objects are detected based on the amount of light that is received at an opposite end of the panel. This type of touch system is also denoted "scanning FTIR system" herein.

Throughout the description, the same reference numerals are used to identify corresponding elements.

Figure 2:
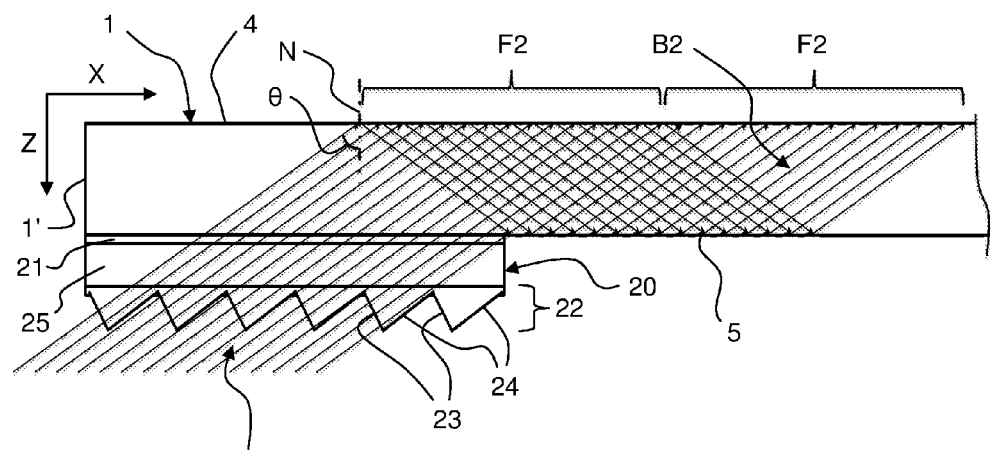
FIG. 2 is an enlarged side view illustrating light paths at an incoupling site of the apparatus in FIG. 1.

FIG. 1 is a top plan view of a scanning FTIR system. The system includes a light transmissive panel 1, two light-emitting input scanners 2A, 2B and two light sensors 3A, 3B. The panel may be planar or curved and defines two opposite and generally parallel surfaces 4, 5 (see FIG. 2), which are connected by a peripheral edge surface 1' (FIG. 2). A radiation propagation channel is provided between the top and bottom surfaces 4, 5 of the panel 1, wherein at least one of the surfaces 4, 5 ("the touch surface") allows the propagating light to interact with a touching object O1. Typically, the light from the input scanners 2A, 2B is injected to propagate by total internal reflection (TIR) in the radiation propagation channel, and the sensors 3A, 3B are arranged downstream the propagation direction to receive the light and generate a respective measurement signal which is indicative of the energy of received light. The phenomenon of TIR is well known in the art and will not be explained further.

Generally, the panel may be made of any material that transmits a sufficient amount of radiation in the relevant wavelength range to permit a sensible measurement of transmitted energy. Such material includes glass, poly(methyl methacrylate) (PMMA) and polycarbonates (PC).

It should be noted that the propagating light needs only be reflected by TIR in the touch surface, and that the opposite surface may be provided with a reflective coating. However, if both surfaces 4, 5 are to be used as touch surfaces, or if the touch system needs to be transparent for viewing through the surfaces 4, 5, the touch system may be designed to propagate the light by TIR in both surfaces 4, 5. If the touch system needs to be transparent for viewing through the surfaces 4, 5, the bottom surface 5 may instead be provided with a coating that is transparent for viewing at right angles, but which is reflective to light propagating inside the panel. For example, such a coating may be designed to transmit visible light while reflecting infrared light, at least for a range of angles of incidence.

In FIG. 1, each of the input scanners 2A, 2B is arranged to generate and sweep a beam of light along an elongate fixed re-directing element 4A, 4B that is designed and arranged to output a beam with a desired direction. Downstream of the re-directing element 4A, 4B, the beams are swept along elongate incoupling sites 5A, 5B on the bottom surface 5 (FIG. 2) of the panel 1. The combination of input scanners 2A, 2B, re-directing elements 4A, 4B and incoupling sites 5A, 5B forms an illumination arrangement which is configured to sweep two beams B1, B2 inside the panel in two different directions R1, R2. Each beam B1, B2 is suitably collimated at least along its main direction in the plane of the panel (x,y plane), and may or may not be collimated also in the depth direction (i.e. transverse to the plane of the panel). The sweeping of each beam B1, B2 serves to form a respective curtain of light on the touch surface from within the panel. Each such light curtain illuminates the touch surface, or part thereof. The light may be generated by any type of light source capable of emitting light in the desired wavelength range, for example a diode laser, a VCSEL (vertical-cavity surface-emitting laser), or an LED (light-emitting diode), an incandescent lamp, a halogen lamp, etc.

The received energy along an elongate outcoupling site 6A, 6B on the bottom surface 5 of the panel 1 is measured by the sensors 3A, 3B which are arranged to receive the beams B1, B2 as they are swept inside the panel 1. The sensors 3A, 3B may include or be part of any type of device capable of converting light into an electrical measurement signal, e.g. a photo-detector, a CCD or CMOS detector, etc.

In the specific example of FIG. 1, a fixed elongate re-directing device 7A, 7B is arranged to receive and re-direct the outcoupled beams B1, B2 onto a common detection point D1, D2 while the beams B1, B2 are swept across the panel 1. The combination of outcoupling sites 6A, 6B, re-directing elements 7A, 7B and sensors 3A, 3B forms a detection arrangement. The re-directing devices 4A, 4B, 7A, 7B may operate by reflection or transmission of light and may be made up of diffractive optical elements (DOE), micro-optical elements, mirrors, refractive lenses, and any combination thereof. In one embodiment, the re-directing devices 4A, 4B, 7A, 7B are configured as Fresnel cylindrical lenses.

When the object O1 is brought sufficiently close to the touch surface (in this example, the top surface 4), the total internal reflection is frustrated and the energy of the transmitted light is decreased ("attenuated"). In FIG. 1, a controller 8 is arranged to control the operation of the input scanners 2A, 2B, and a data processor 9 is configured to obtain and process time-resolved measurement signals from the sensors 3A, 3B to determine touch data for the touching object O1 within the sensing area. The touch data may, e.g., represent one or more of the location, shape and size of the object O1. The touch data may be determined by triangulation or more advanced processing techniques, including tomographic reconstruction methods such as FBP (Filtered Back Projection), ART (Algebraic Reconstruction Technique), SART (Simultaneous Algebraic Reconstruction Technique), etc. Further examples of advanced data processing techniques designed for use in touch determination are found in WO 2010/006883, WO2009/077962, WO2011/049511, and WO2011/139213, all of which are incorporated herein by reference.

In the example of FIG. 1, the respective beam B1, B2 has an essentially invariant main direction in the plane of the panel during the sweep. The "main direction" of the beam is the propagation direction of the beam as projected onto the touch surface 4. The main direction is also denoted "scan angle" herein. In the illustrated example, the main directions of the beams B1, B2 are essentially parallel to a respective edge of the panel 1. However, as explained in WO2010/006882, the number of beams, their mutual angle, and their angle with respect to the edges of the panel, may be configured otherwise in order to achieve various technical effects, e.g. multi-touch functionality.

FIG. 2 is a side view of the incoupling site 5B in FIG. 1 as it receives an incoming beam which is collimated in the transverse direction of the incoupling site 5B. The incoupling site 5B is defined by an essentially flat coupling element 20 which is attached to the bottom surface 5 by means of an adhesive layer 21 that is transparent to the light generated by the input scanner 2B (FIG. 1). The coupling element 20 comprises a surface structure 22 which is formed of a light transmissive material and comprises, in the transverse direction of the coupling element 20, an alternating sequence of light-receiving facets 23 and release surfaces 24 (also denoted relief surfaces). In the example of FIG. 2, the surface structure 22 is joined to a transparent substrate 25.

Figure 4:
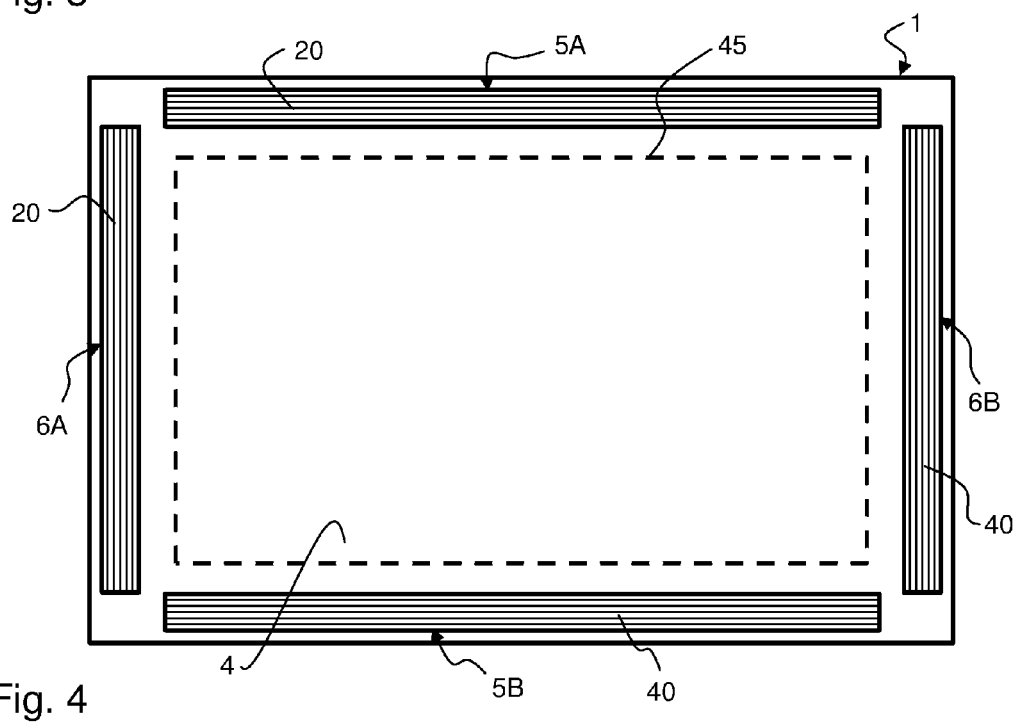
FIG. 4 is a top plan view of a touch panel with elongate incoupling and outcoupling sites.

It should be understood that the facets 23 and release surfaces 24 extend parallel to each other in the longitudinal direction of the coupling element 20, as indicated by thin lines in the plan view of FIG. 4. In the example of FIG. 2, the incoming light is directed essentially normal to the facets 23 in the transverse direction of the coupling element 20. This may serve to reduce or minimize the impact of tolerances in the inclination of the facets 23 on the direction of the transmitted light. Furthermore, reflection losses in the facets 23 are minimized, e.g. if the incoming light is unpolarized. If the incoming light is a single collimated beam which is swept along the coupling element 20 at an essentially invariant scan angle (cf. FIG. 1), the beam is preferably directed normal to the facets 23 also in the longitudinal direction of the coupling element 20. If plural collimated beams with different scan angles are coupled into the panel 1 via the coupling element 20, only one of the beams may be normal to the facets 23 in the longitudinal direction, whereas all beams preferably are normal to the facets 23 in the transverse direction. This will ensure that the beams are given the same bounce angle (see below) inside the panel, and may enable a simplified configuration of the illumination arrangement. Likewise, if the incoming light is collimated in the transverse direction and divergent in the longitudinal direction, the incoming light is preferably directed normal to the facets 23 in the transverse direction.

The release surfaces 24, which may also be denoted "draft facets", are designed so as not to be illuminated by the incoming light and thereby not affect the optical performance of the coupling element. In the illustrated example, the release surfaces 24 are essentially perpendicular to the facets 23, although other release surface designs are conceivable.

As shown in FIG. 2, the coupling element 20 transmits the incoming light such that it hits the top surface 4 at an angle of incidence θ to the normal N of the surface 4. The angle of incidence θ is also denoted "bounce angle" herein. The light is directed onto the coupling element 20 such that the bounce angle θ exceeds the so-called critical angle $\theta_c$, which is the minimum angle to sustain total internal reflection. For a boundary between panel material and air, the critical angle $\theta_c$ is approximately 42°, assuming an index of refraction of 1.5 for the panel material. It may be preferable for the bounce angle to exceed about 60°, since the present Applicant has found that water deposits on either of the surfaces 4, 5 may result in a significant frustration of the total internal reflection for bounce angles below about 60°, whereas the frustration may be less for larger bounce angles. Furthermore, it has been found that the frustration caused by human fingers touching the panel material may decrease for bounce angles above about 70°. Thus, by designing the illumination arrangement to generate bounce angles in the approximate range of 60°-70°, it is possible to minimize the unwanted influence of deposits on the touch surface while maximizing the desired influence of touching objects. Presently, the most preferred range of bounce angles is in the range of 64°-68°.

Although not shown in FIG. 2, it is to be understood that the transmitted light may be refracted in any one of the boundaries between the structure 22 and the substrate 25, between the substrate 25 and the adhesive layer 21, and between the adhesive layer 21 and the panel 1, due to differences in refractive index across these boundaries. The skilled person realizes that the angle of the facets 23 and/or the inclination of the incoming light may be adapted in view of such refraction, to achieve a desired bounce angle θ inside the panel 1.

The illumination arrangement is designed to illuminate the touch surface 4 from within the panel 1. Preferably, the illumination arrangement should be designed to avoid that an incoming beam bounces inside the panel 1 such that it illuminates the touch surface 4 in spatially separated regions. This may be avoided by requiring the incoming beam to at least have a minimum extent in the transverse direction of the coupling element (x direction in FIG. 2), such that there is no gap between the footprint F2 of the beam B2 at successive reflections in the touch surface 4. The minimum extent is a function of the bounce angle and the thickness of the panel 1. To attain a uniform illumination of the touch surface 4, the illumination arrangement may be designed to generate a beam of light that is collimated in the depth direction (i.e. as seen in the x,z plane of FIG. 2) and propagates by TIR to produce footprints F2 that are placed edge to edge along the touch surface 4. In such an example, the minimum extent is given by $F2=2D \tan \theta$, where θ is the bounce angle, and D is the thickness of the panel 1 (in the z direction). When the footprints F2 are placed edge to edge, the energy distribution of the footprint F2 (in the x direction) may be a "top hat" function, i.e. an essentially even distribution of energy bounded by steep gradients.

To accommodate for tolerances in the illumination arrangement and/or the panel 1, the illumination arrangement may instead be nominally designed to generate an overlap between successive footprints F2. In such a variant, the individual footprint F2 may have a "smooth" energy distribution, namely such an energy distribution that the combination of overlapping footprints F2 produces a relatively uniform illumination of the touch surface. Such a smooth footprint F2 has end portions with gradually decreasing energy, and may e.g. have an energy distribution (in the x-direction) that resembles a Gaussian function. To this end, the incoming light may be given a desirable beam profile by the light source or by a dedicated optical device in the illumination arrangement, and/or the energy distribution of the incoming light may be modified by diffusing structures embedded in the coupling element 20, as discussed further below.

Furthermore, to reduce the need to accurately center the incoming light on the coupling element 2, or vice versa, the illumination arrangement may be designed to generate the incoming light that has a larger extent in the transverse direction than the coupling element 20.

It may be desirable to use divergent light in the illumination arrangement, i.e. upstream of the panel 1, for example to reduce the required size of optical components (mirrors, lenses etc) used for directing the light from the input scanner 2A, 2B to the incoupling site 5A, 5B. In one embodiment, the coupling element 20 is designed with an optical power such that divergent incoming light is essentially collimated in the depth direction when it is transmitted into the panel 1. The optical power may be obtained by designing each facet 23 with a dedicated inclination such that the resulting light refraction by all facets 23 collectively collimates the incoming divergent light. In an alternative embodiment, incoming divergent light is coupled into the panel 1 so as to diverge in the depth direction as it propagates by total internal reflection. In such an embodiment, to minimize reflective losses in the coupling elements 20 and/or refraction of the transmitted light, the facets 23 may be individually angled so as to be essentially perpendicular to the incoming light.

Generally, the coupling element 20 may be designed with an optical power that generates a desired change of a beam property of the incoming light, e.g. such that the transmitted light has a certain divergence or convergence, or is collimated, in one or more directions (e.g. in the x,z plane or in the x,y plane in FIGS. 1-2)

It should be understood that the size of the coupling element 20 and its surface structure 22 is exaggerated in FIG. 2. In practical implementations, the surface structure is typically a micro-structure that projects less than 1 mm from the panel surface 5. For example, the substrate may have a thickness of about 50-300 μm, and the surface structure may project about 20-100 μm from the substrate. Also, the number of facets 23 in the transverse direction may be larger than shown in FIG. 2. The spacing of facets 23 may be given as a pitch, which is the extent of one facet 23 and one release surface 24 in the transverse direction of the coupling element 20. The pitch is a function of the thickness of the structure 22 and the angle of the facets 23. Typically, the pitch is in the range of about 50-500 μm.

Figure 3:
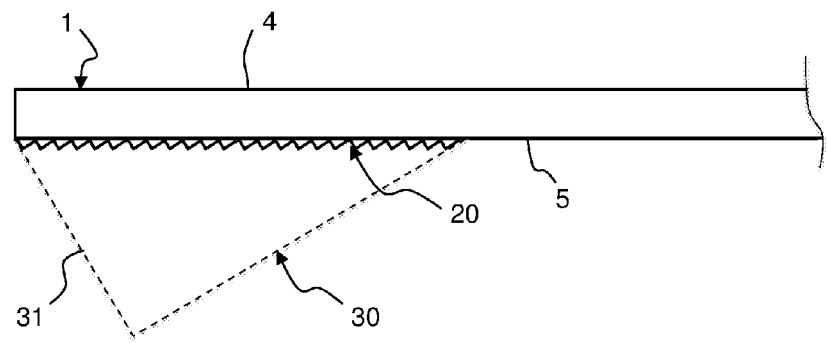
FIG. 3 illustrates a comparison between an embodiment of the invention and a conventional coupling element.

FIG. 3 is a side view of a coupling element 20 similar to the one in FIG. 2 and is intended to show that the coupling element 20 is designed to correspond to a wedge 30 of solid transparent material, as used in the prior art. Such a wedge 30 is indicated by dotted lines in FIG. 3. By proper arrangement of the facets and the release surfaces, the facets collectively define an input surface for the incoming light, which functionally corresponds to the front light-receiving surface 31 of the wedge 30. Thus, the micro-structured, sheet-like coupling element 20 is capable of replacing the conventional wedge 30. The input surface of the coupling element 20 is thus made up of the facets 23, which are designed such that the illuminated portions of the facets 23 act as a continuous or coherent surface of proper inclination for the incoming light. Although the illustrated examples represent a coupling element 20 with straight elongate facets 23, it is to be understood that the facets may be curved, e.g. to couple light from a point-like light source into the panel. For example, such curved facets may be designed to mimic the curved input surface of the incoupling wedge as disclosed in US2004/0252091.

FIG. 4 is a top plan view of an optical panel component for the touch system in FIG. 1. The optical panel component is formed by the light transmissive panel 1, the incoupling elements 20 that are provided on the bottom surface 5 to define the incoupling sites 5A, 5B, and the outcoupling elements 40 that are provided on the bottom surface 5 to define the outcoupling sites 6A, 6B. It is to be understood that the incoupling and/or outcoupling elements 20, 40 may alternatively or additionally be provided on the top surface 4. It is also conceivable that the outcoupling sites 6A, 6B are formed on the edge surface (cf. 1' in FIG. 2). As noted above, the facets 23 are mutually parallel and extend in the longitudinal direction of the incoupling element 20, such that the incoupling element 20 has the same optical properties along its extent. Each incoupling element 20 may be formed as a separate sheet-like component which is optically coupled and fixedly attached to the surface of the panel 1. In one embodiment, the incoupling element 20 is in the form of a micro-structured tape with an adhesive backing ("a coupling tape"). Alternatively, the incoupling elements 20 may be implemented as structures integrated in the surface of the panel 1. The specific design of the illustrated touch system (FIG. 1), namely the similarity between the illumination arrangement and the detection arrangement, may allow the outcoupling elements 40 to be similar, or even identical, to the incoupling elements 20. FIG. 4 also indicates the sensing area 45 of the touch system, which is the area where touching objects may be detected. Typically, the sensing area 45 is defined as the surface area of the touch surface that is illuminated by at least two overlapping sheets of light with different scan angles.

By designing the incoupling element 20 with a microstructured surface, the weight and size of the incoupling element 20 may be reduced to a minimum. If the microstructured surface is integrated into the top or bottom surface 4, 5 of the panel 1, the risk for detachment of the incoupling element 20 from the panel 1 is eliminated. If the microstructured surface is implemented as a thin, sheet-like component that is attached to the panel surface, the reduced thickness of the component allows the component to deform and thereby absorb shear forces that are formed in the joint between the component and the panel surface, e.g. because of differences in thermal expansion. Thereby, the risk for a local detachment of the incoupling element is significantly reduced compared to a wedge-shaped incoupling element as indicated in FIG. 3.

Figure 5:
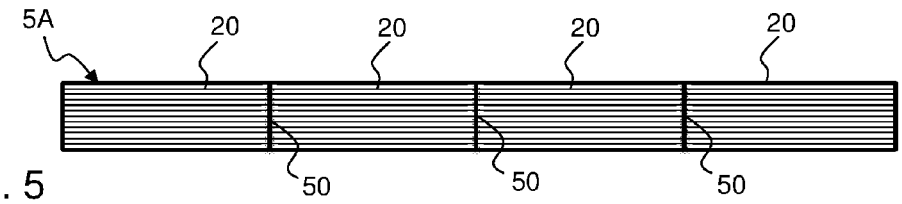
FIG. 5 is a top plan view of a coupling tape according to one embodiment.
Figure 6:
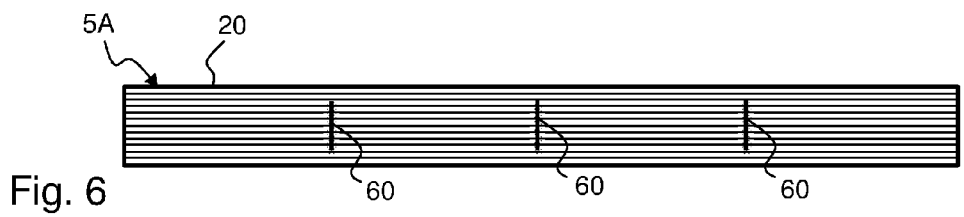
FIG. 6 is a top plan view of a coupling tape according to another embodiment.

The ability of absorbing shear forces may be further improved by providing the incoupling sites 5A, 5B with force absorbing portions that extend in the transverse direction. FIG. 5 illustrates an embodiment in which a sequence of coupling elements 20 are arranged one after the other along the incoupling site 5A. The transverse ends are arranged in abutting relationship, forming a border 50 between the elements 20, such that shear forces may act to move the coupling elements 20 slightly apart in the longitudinal direction of the incoupling site 5A, thereby reducing the shear forces in the adhesive layer (cf. 21 in FIG. 2). FIG. 6 illustrates an embodiment in which a unitary coupling element 20 is provided with transverse lines of weakness 60, e.g. cut-outs or thinned portions, which serve to absorb shear forces. It is to be understood that the abutting ends (FIG. 5) and the lines of weakness 60 (FIG. 6) may be designed with any angle with respect to the longitudinal direction of the incoupling site 5A. As used herein, a "line of weakness" denotes an elongated portion of weakened material, which may be created by locally thinning the material, by providing cuts, scores or perforations in the material, or by otherwise processing the material to locally decrease its strength.

As mentioned above, beams may be swept inside the panel at any scan angle, e.g. at a scan angle that is non-perpendicular to the extent of the incoupling site 5A, 5B. As noted in the Background section, such non-perpendicular scan angles require the light to pass the incoupling site 5A, 5B at an angle to its transverse direction and may thus be reflected or otherwise disturbed by the borders 50 in FIG. 5 and the lines of weakness 60 in FIG. 6, respectively.

However, since the coupling element 20 is implemented as a thin sheet-like component, these borders 50 and lines of weakness 60 have a minute surface area and thus have a minimal influence on the transmitted light.

The surface structure 22 of the coupling element 20 may be manufactured using any known technique for replicating micro-structures, including compression molding, injection molding, hot embossing, and wafer level optics. In such processes, the structures are replicated onto a substrate which, as indicated above, may be the panel surface or a separate sheet material.

Figure 7:
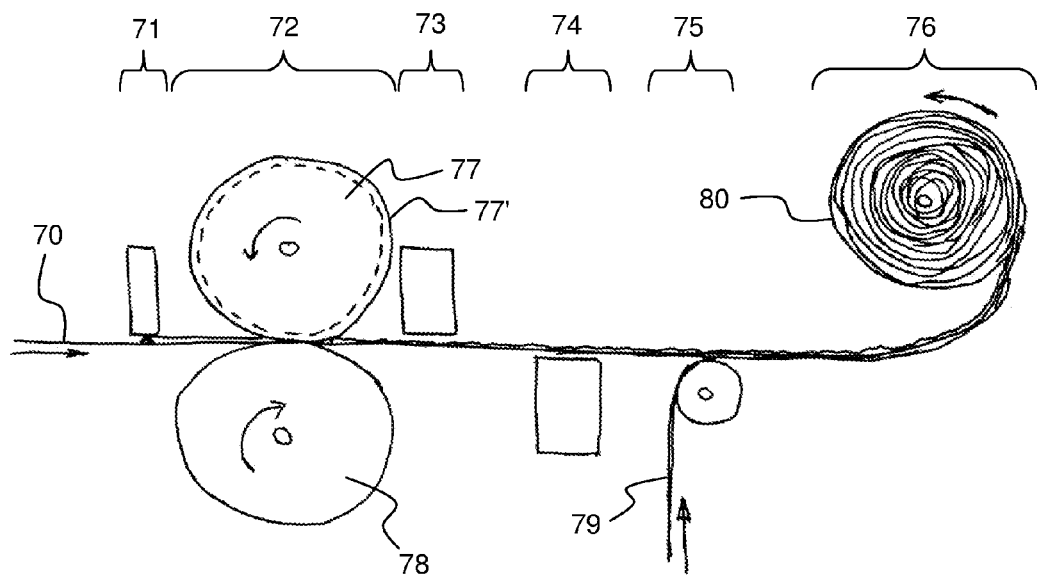
FIG. 7 is a side view of a production plant for manufacturing a micro-structured sheet for use in producing the coupling tapes in FIGS. 5 and 6.

FIG. 7 is a schematic illustration of another technique for mass-production of the above-mentioned coupling tape. A web 70 of thin, flexible sheet material is continuously or intermittently fed through a manufacturing plant for processing in a sequence of stations 71-76. In station 71, a photo-curable resin composition is applied to the surface of the web 70. The resin composition is selected to be curable to a state that is flexible with respect to the final thickness of the resulting surface structure (cf. thickness of structure 22 in FIG. 2). Examples of resin compositions include, but are not limited to, acrylate, epoxy and urethane based materials. In station 72, the web 70 is passed through a pair of rotating rollers 77, 78, which replicate a microstructure in the resin. The roller 77 has a master negative microstructure molding pattern 77' on its outer surface, and the roller 78 has a smooth periphery. The molding pattern 77' is a negative of the facets 23 and release surfaces 24 (FIG. 2) and may be produced by diamond cutting either an array of parallel discrete circumferential grooves on the roller 77 or a single continuous groove that spirals the circumference of the roller 77. In station 73, the replicated micro-structure in the resin is cured by exposing the resin to radiation, e.g. ultraviolet radiation. In station 74, an adhesive is applied to the lower side of the web 70 to form an adhesive backing. In station 75, a web 79 of thin plastic or paper material is joined with the web 70 to form a protective sheet for the adhesive backing. In station 76, the micro-structured sheet is winded into a roll 80.

Figure 8:
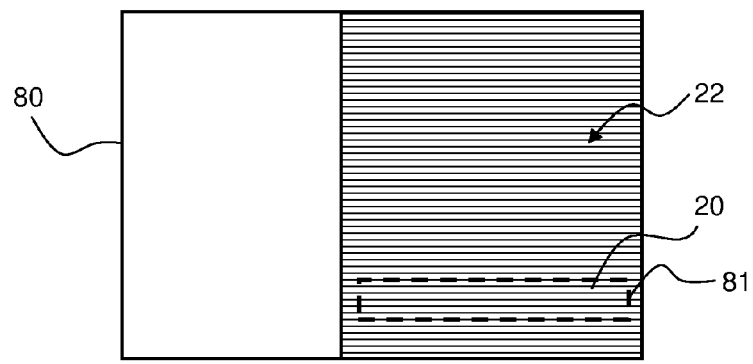
FIG. 8 is a top plan view of a sheet roll produced in the plant of FIG. 7.

FIG. 8 is a plan view of the roll 80 with an end portion rolled out to display the surface structure 22 of the micro-structured sheet, where the parallel lines represent apices between facets and release surfaces (with greatly exaggerated spacing). Dashed lines 81 indicate a cut for extracting a coupling element 20 from the micro-structured sheet. It is to be understood that station 76 in FIG. 7 may be replaced by a station for cutting coupling elements from the micro-structured sheet.

Returning to FIG. 2, it has already been noted that the facets 23 may be provided with an optical power, by designing the facets to individually refract the incoming light. The facets 23 may alternatively, or additionally, be provided (embedded) with other functional structures. In one example, the facets 23 (or a subset thereof) incorporate light diffusing structures, i.e. structures that scatter the incoming light. The use of light diffusion may be advantageous to reduce the influence of tolerances in certain designs of the touch system. For example, the diffusing structures may be designed to modify the energy distribution of the incoming light, e.g. to generate a desired energy distribution of the footprint (F2 in FIG. 2) so as to allow overlaps between successive reflections, as discussed above. By incorporating the diffusing structures into the facets 23 of the incoupling element 20, the diffusing structures are arranged in the immediate vicinity of the panel 1, which enables a well-controlled diffusion of the light within the panel 1.

The diffusing structures may be implemented as a curvature of the individual facet 23, whereby the curvature defines a micro-lens on the facet 23. The curvature may be in the transverse direction of the facet 23, e.g. such that the facet surface forms part of the surface area of a cylinder. Such a diffusing structure may be used to modify the energy distribution of the footprint. It is also conceivable that the curvature is in the longitudinal direction of the facet 23, or in both directions to form a spherical surface. In a variant, the diffusing structures may be designed to generate the light diffusion (or part thereof) by diffraction of the incoming light. Irrespective of implementation, the coupling element 20 may be designed to produce an amount of diffusion in the order of a few degrees.

Figure 9A:
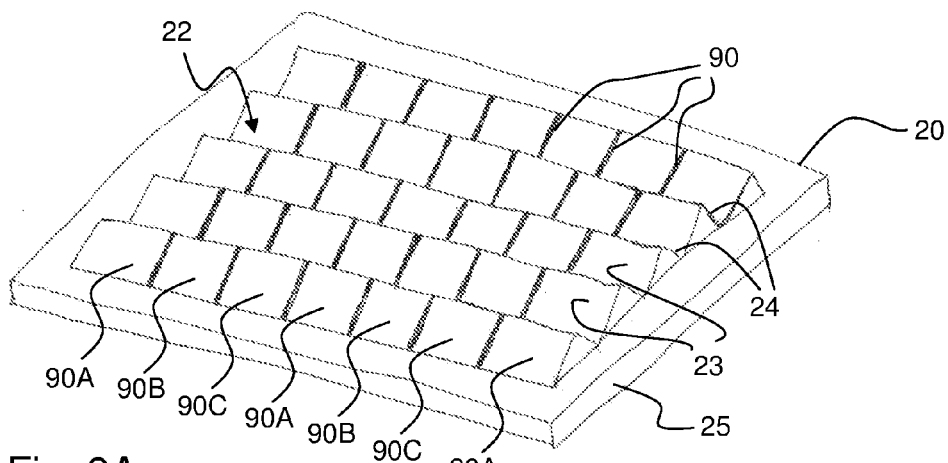
FIG. 9A is a perspective view of a coupling element according to one embodiment.
Figure 9B:
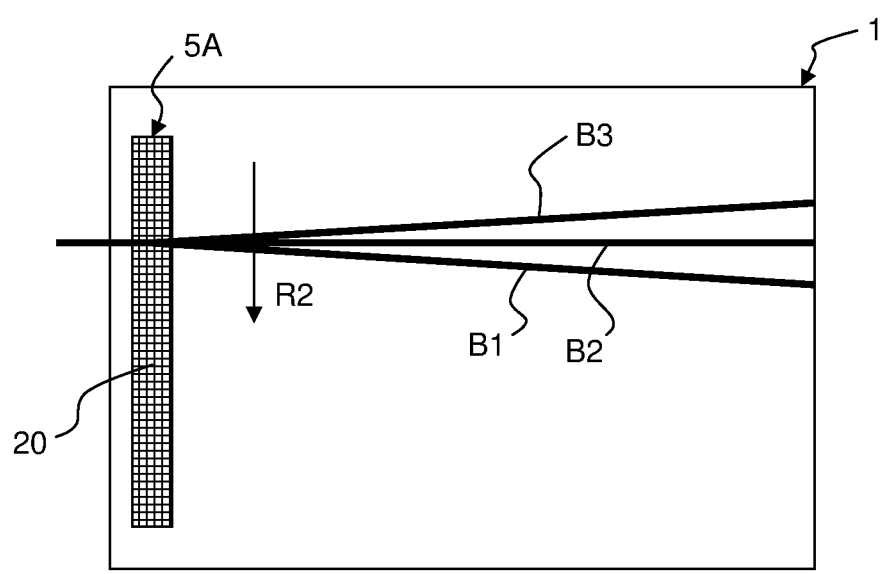
FIG. 9B is a top plan view of the coupling element in FIG. 9A as installed in a touch-sensitive apparatus.

In another example, the facets 23 (or a subset thereof) incorporate beam separating structures. FIG. 9A is a perspective view of such an incoupling element 20, in which an array of non-transmissive, essentially identical, parallel, elongated lines 90 are provided in the longitudinal direction of the facets 23. As shown, the lines 90 essentially extend in the transverse direction of the facets 23. The lines 90 may, e.g., be formed by depositions of non-transmissive material, or be formed as grooves in the facet surface. In one embodiment, the lines 90 collectively define a transmission grating that separates the transmitted light into a number of beams with different and well-defined scan angles. FIG. 9B is a plan view to illustrate the use of such a diffractive incoupling element 20. An incoming beam of light is swept in direction R2 along the incoupling element 20, which couples the light into the panel for propagation by TIR while generating a zero-order beam B2 as well as first-order beams B1, B3 on the sides of the zero-order beam. Although not shown on the drawing, the incoupling element 20 may be designed to generate beams of higher orders as well. It is realized that this is a compact, robust and cost-effective way of generating plural light sheets with well-defined scan angles in the panel. In a variant (not shown), the beam separating structures are implemented as planar "sub-facets" of different inclination that are arranged in the longitudinal direction of the facet 23. Each inclination results in a dedicated refraction of the incoming light, thereby resulting in a number of beams of different directions. Reverting to FIG. 9A, reference numerals 90A and 90C may represent sub-facets with a small inclination to the left and right with respect to the incoming light, and reference numeral 90B may represent sub-facets that are perpendicular to the incoming light. Thereby, with reference to FIG. 9B, sub-facets 90A, 90B and 90C may generate beams B3, B2 and B1, respectively. In yet another variant, the beam separating structures are implemented by a combination of refractive and diffractive structures.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

The touch system illustrated and discussed in the foregoing is merely given as an example. The inventive incoupling structure is useful in any touch system that operates by transmitting light inside a light transmissive panel. As noted in the Background section, such touch systems may be configured to detect the light that is frustrated and then scattered at the point of touch, or to detect the energy decrease in the propagating light caused by the frustration and scattering at the point of touch. In addition to the examples given in the Background section, some further examples of touch systems may be found in U.S. Pat. No. 7,432,893, US2006/0114237, US2007/0075648, WO2009/048365, WO2010/006883, WO2010/006884, WO2010/006885, WO2010/006886, WO2010/064983 and WO2008/038066, which are all incorporated herein by this reference.

The invention claimed is:

1. A touch-sensitive apparatus, comprising:
   a light transmissive panel that defines parallel top and bottom surfaces;
   an illumination arrangement configured to couple light into the light transmissive panel via an incoupling site such that the light propagates by total internal reflection in at least one of the top and bottom surfaces, and such that an object touching said at least one of the top and bottom surfaces causes a change in the propagating light;
   a detection arrangement including a light detector configured to detect said change in the propagating light;
   wherein the incoupling site has an elongated structure and is arranged at a peripheral edge surface of the light transmissive panel; and
   wherein the incoupling site is defined by a sheet-like micro-structured surface portion, which is fixedly arranged on one of the top and bottom surfaces, the sheet-like micro-structured surface portion configured to transmit light having an angle of incidence that enables light propagation by total internal reflection inside the light transmissive panel.

2. The apparatus of claim 1, wherein the sheet-like micro-structured surface portion is included in a thin film attached to the light transmissive panel.

3. The apparatus of claim 2, wherein the thin film comprises a sheet substrate of plastic material and facets formed by structuring and curing a resin on the sheet substrate.

4. The apparatus of claim 3, wherein the thin film comprises an adhesive backing opposite to the facets.

5. The apparatus of claim 2, wherein the incoupling site is defined by a sequence of separate thin films arranged side by side in a longitudinal direction of the incoupling site.

6. The apparatus of claim 2, wherein the thin film comprises at least one line of weakness that extends in a transverse direction of the incoupling site.

7. The apparatus of claim 1, wherein the sheet-like micro-structured surface portion is configured to project from said one of the top and bottom surfaces by less than 1 mm.

8. The apparatus of claim 1, wherein the sheet-like micro-structured surface portion comprises a plurality of parallel elongate facets that collectively mimic a substantially continuous input surface for receiving the light to be coupled into the light transmissive panel.

9. The apparatus of claim 8, wherein all of the facets have substantially the same angle to a normal of the top and bottom surfaces.

10. The apparatus of claim 8, wherein
   each facet is bounded by elongate release surfaces;
   the elongate release surfaces extend parallel to the facet; and
   the elongate release surfaces are substantially perpendicularly inclined relative to the facet.

11. The apparatus of claim 8, wherein
   the elongate facets extend in a longitudinal direction and are distributed in a transverse direction of the sheet-like micro-structured surface portion; and
   the illumination arrangement is further configured to direct light onto the sheet-like micro-structured surface portion such that the sheet-like micro-structured surface portion receives light with a main direction that is substantially perpendicular to the facets at least in the transverse direction.

12. The apparatus of claim 8, wherein at least a subset of the facets have an individual inclination such that the sheet-like micro-structured surface portion has an optical power that affects the transmitted light.

13. The apparatus of claim 8, wherein at least a subset of the facets is provided with a diffusing surface structure.

14. The apparatus of claim 13, wherein the diffusing surface structure comprises micro-lens elements on the facets.

15. The apparatus of claim 8, wherein at least a subset of the facets is configured to separate incoming light into a number of distinct beams, the distinct beams having different main directions in the plane of the light transmissive panel.

16. The apparatus of claim 15, wherein the facets have a diffractive grating structure configured to separate the incoming light into the number of distinct beams.

17. The apparatus of claim 1, wherein the illumination arrangement is further configured to direct light onto the sheet-like micro-structured surface portion such that the sheet-like micro-structured surface portion receives collimated light in a transverse direction of the incoupling site.

18. The apparatus of claim 1, wherein the illumination arrangement is further configured to direct light onto the sheet-like micro-structured surface portion such that the sheet-like micro-structured surface portion receives divergent light in a transverse direction of the incoupling site.

19. The apparatus of claim 1, wherein the sheet-like micro-structured surface portion is integrated in the light transmissive panel.

20. An optical coupling element for coupling light into a light transmissive panel in a touch-sensitive apparatus, the light transmissive panel having parallel top and bottom surfaces and being arranged to propagate light by total internal reflection from an incoupling site to an outcoupling site, the optical coupling element comprising:
  a film of light transmissive plastic material having a micro-structured surface portion and an attachment surface opposite to the micro-structured surface portion, wherein
    the film is configured for attachment to one of the top and bottom surfaces to form at least part of the incoupling site,
    the micro-structured surface portion is arranged to transmit light that has an angle of incidence enabling light propagation by total internal reflection inside the light transmissive panel, and
    the optical coupling element has an elongated structure and is arranged at a peripheral edge surface of the light transmissive panel.

21. A touch-sensitive apparatus, comprising:
  a light transmissive panel that defines parallel top and bottom surfaces;
  an illumination arrangement configured to couple light into the light transmissive panel via an incoupling site such that the light propagates by total internal reflection in at least one of the top and bottom surfaces, and such that an object touching said at least one of the top and bottom surfaces causes a change in the propagating light;
  a detection arrangement including a light detector configured to detect said change in the propagating light;
  wherein the incoupling site is defined by a sheet-like micro-structured surface portion, which is fixedly arranged on one of the top and bottom surfaces, the sheet-like micro-structured surface portion configured to transmit light having an angle of incidence that enables light propagation by total internal reflection inside the light transmissive panel; and
  wherein the sheet-like micro-structured surface portion includes a plurality of facets facing outward, away from the one of the top and bottom surfaces.

22. An optical coupling element for coupling light into a light transmissive panel in a touch-sensitive apparatus, the light transmissive panel having parallel top and bottom surfaces and being arranged to propagate light by total internal reflection from an incoupling site to an outcoupling site, the optical coupling element comprising:
  a film of light transmissive plastic material having a micro-structured surface portion and an attachment surface opposite to the micro-structured surface portion, the micro-structured surface portion including a plurality of facets, wherein
    the film is configured for attachment to one of the top and bottom surfaces with the plurality of facets facing outward away from the one of the top and bottom surfaces, and to form at least part of the incoupling site, and
    the micro-structured surface portion is arranged to transmit light that has an angle of incidence enabling light propagation by total internal reflection inside the light transmissive panel.

* * * * *